(12) United States Patent
Steinert et al.

(10) Patent No.: US 7,692,879 B2
(45) Date of Patent: Apr. 6, 2010

(54) CORRECTION DEVICE FOR AN OPTICAL ARRANGEMENT AND CONFOCAL MICROSCOPE WITH SUCH A DEVICE

(75) Inventors: Joerg Steinert, Jena (DE); Matthias Wald, Kunitz (DE); Saskia Pergande, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 11/822,010

(22) Filed: Jun. 29, 2007

(65) Prior Publication Data
US 2007/0253046 A1 Nov. 1, 2007

Related U.S. Application Data

(63) Continuation of application No. 11/783,902, filed on Apr. 12, 2007, now abandoned, which is a continuation of application No. 10/967,347, filed on Oct. 19, 2004, now abandoned.

(30) Foreign Application Priority Data

Jul. 16, 2004 (DE) .................. 10 2004 034 960

(51) Int. Cl.
*G02B 27/00* (2006.01)
(52) U.S. Cl. .................. 359/810; 359/379; 359/368; 359/384
(58) Field of Classification Search .......... 359/379, 359/810
See application file for complete search history.

(56) References Cited

U.S. PATENT DOCUMENTS

| 3,817,626 A | 6/1974 | Lietar |
| 4,515,447 A | 5/1985 | Weimer et al. |
| 4,781,445 A | 11/1988 | Baba et al. |

(Continued)

FOREIGN PATENT DOCUMENTS

DE          101 07 210 C1     10/2002

(Continued)

OTHER PUBLICATIONS

"Planflächen, Planplatten, Reflexionsprismen and Strahlenteiler," Technische Optik, Grundlagen Und Anwendungen, Section 2.3.2, Vogel Buchverlag, 1990.

(Continued)

*Primary Examiner*—Jessica T Stultz
(74) *Attorney, Agent, or Firm*—Jacobson Holman PLLC

(57) ABSTRACT

A correction device for an imaging optical arrangement exhibiting a light path (1), in particular for a microscope, that exhibits at least one plane-parallel transparent plate (9), which is held in a mounting plate in the image beam path (1) and is propelable around at least one axle in a tipping and/or a swiveling motion, in order in adjust a definite parallel misalignment of the beams in the image beam path (1) by a change in the tipping situation of the plate (9). A confocal microscope with such a correction device exhibits a confocal screen (4), which illustrates a specimen mark (10), whereby the plane-parallel plate (9) is placed in front of the detector unit (2) in the light path (1), in order to center the illustration of the aperture diaphragm on the detector unit.

25 Claims, 2 Drawing Sheets

U.S. PATENT DOCUMENTS

| | | |
|---|---|---|
| 5,341,246 A | 8/1994 | Oono et al. |
| 5,537,248 A | 7/1996 | Sander |
| 5,583,694 A | 12/1996 | Takahashi et al. |
| 5,638,206 A * | 6/1997 | Sumiya et al. ............. 359/368 |
| 6,288,382 B1 | 9/2001 | Ishihara |
| 6,437,354 B1 | 8/2002 | Nara et al. |
| 6,555,802 B2 | 4/2003 | Osipchuk et al. |
| 6,717,125 B2 | 4/2004 | Schoeppe |
| 6,795,240 B2 | 9/2004 | Ogihara |
| 2002/0181096 A1 * | 12/2002 | Sasaki ...................... 359/389 |
| 2003/0132394 A1 | 7/2003 | Wolleschensky |
| 2004/0246572 A1 | 12/2004 | Muller |
| 2006/0012785 A1 | 1/2006 | Funk et al. |
| 2006/0012871 A1 | 1/2006 | Funk et al. |
| 2007/0253044 A1 * | 11/2007 | Steinert et al. ............. 359/196 |

FOREIGN PATENT DOCUMENTS

| | | |
|---|---|---|
| DE | 101 47 481 A1 | 4/2003 |
| GB | 217262 | 6/1924 |
| GB | 279 040 | 11/1928 |
| GB | 418 562 | 10/1934 |
| GB | 490381 | 8/1938 |
| GB | 893 990 | 4/1962 |
| GB | 1207481 A | 10/1970 |
| GB | 1363263 A | 8/1974 |
| GB | 2 115 576 A | 9/1983 |
| JP | 60 107014 A | 12/1985 |
| JP | 11 038298 A | 2/1999 |
| WO | WO 02/067037 * | 8/2002 |

OTHER PUBLICATIONS

Patent Abstracts of Japan, Publication No. 11 038298, Feb. 12, 1999.
Patent Abstracts of Japan, Publication No. 60 107014, Dec. 6, 1985.

* cited by examiner

CORRECTION DEVICE FOR AN OPTICAL ARRANGEMENT AND CONFOCAL MICROSCOPE WITH SUCH A DEVICE

This application is a continuation application of U.S. Ser. No. 11/783,902 filed Apr. 12, 2007 now abandoned, which is a continuation application of U.S. Ser. No. 10/967,347 filed Oct. 19, 2004 now abandoned, which are incorporated in their entireties by reference herein.

BACKGROUND OF THE INVENTION

1. Field of the Invention

The invention refers to a correction device for an optical arrangement that exhibits a light path, for example for a microscope. It specially refers to a confocal microscope with such a correction device.

2. Related Art

Optical arrangements, like for example microscopes, confocal microscopes or laser scanning microscopes regularly exhibit adjustable elements, in order to adjust different operating conditions. Thus it is well known for example, to exchange filters or color splitters, in order to be able to work with different lighting wavelengths or to evaluate different fluorescence radiation in different wavelength ranges. The adjustment or change mechanisms must be implemented regularly, mechanically and very expensively and with high precision, in order to keep the chances of unwanted disturbances of the light path during element change or element adjustment as small as possible.

This problem is faced especially in confocal microscopes or laser scanning microscopes, in which a confocal slit with a detector unit is used, that either contains a detector screen on its side or acts as one. Since even with very large mechanical expenditure for the changeable or adjustable elements, influences of the light path for example by tipping errors or wedge errors at the optical element can never be completely ruled out, partially cost-effective correction mechanisms are provided in the prior art, to change the light path of the image with such pinhole-objectives.

Thus in DE 101 47 481 A1 for example an adjustable confocal slit for a laser scanning microscope is described, that makes a displacement of the aperture possible, to be able to shift the confocal slit appropriately in tipping errors or wedge errors that are caused by adjustment or change of optical elements, so that an optimal image is always formed in the confocal microscope. The DE 101 07 210 C1 describes a similar approach, which likewise adjusts relevant elements in the optical arrangement. There, in a confocal microscope a focusing lens in the arrangement can be shifted transverse to the Z-axis of the light path. It can also be used to bring about an adjustment of the image in the confocal microscope.

It is thus common in the approaches of the prior art, to change the optical arrangements in the confocal microscope, i.e. in the optical imaging arrangement—either by the change of the location of a confocal slit with respect to the object to be imaged or by the adjustment of other imaging elements of the imaging optics. Apart from a relatively large mechanical/optical effort necessary in these approaches, there exists a fundamental problem in this principle pursued in the state of the art, that the reproduction ratios are no longer comparable from time to time. A laborious new calibration of imaging scales can become necessary.

SUMMARY OF THE INVENTION

Therefore the purpose of this invention is to provide a correction device for an optical imaging arrangement, with which a correction can be applied without adjusting the optical image itself, especially without having to adjust the optical elements.

According to the invention this task is solved with a correction device for an imaging optical arrangement exhibiting an optical path, wherein the device exhibits at least one plane parallel transparent plate, that is held in a mounting plate in the optical path and is movable around at least one axis by means of the mounting plate in a tipping movement and/or swiveling, in order to adjust a constant parallel shift of the light path by change of the tipping situation of the plate.

The invention especially provides for a confocal microscope, whereby the microscope focuses a selected specimen area on a confocal slit, to which a detector unit is downstream and whereby the plate is placed upstream in the optical path of the detector unit, in order to center the image.

According to the invention the correction device has the advantage that a simple compensation or correction of errors developing in the image of the optical arrangement is possible. Especially simple environment or system temperature, radiation used by changeable or mobile elements in the arrangement, color defects due to wavelength or wavelength ranges can be corrected. Thereby depending on requirement a tipping and/or a swiveling plate with one axis can be sufficient. If one would like to plan a two axis parallel shift, one can either use two axis tipping and/or swiveling plates, or one can plan a two plate arrangement, one axis tipping arid one swiveling. It is essential to the invention that the plane parallel plate can be tipped with the mounting plate in a defined and known way in the light path. For a two-axis adjustment each combination of tipping and swiveling is suitable. A combination of a tipping and swiveling movement is mechanically and relatively simple to realize and has surprisingly no disadvantages despite the shifting of the plane parallel plate along the Z-axis that arises during the swiveling.

The correction brought about by the device can be done by a user manually, e.g. with an adjustment in the works. However, further training with a servo mechanism is particularly preferable, which records at least one operating parameter of the optical arrangement and which adjusts the tipping situation depending on the value of the operating parameter. The tipping situation can be put into calibration tables, for example. Also it is possible to optimize a correction by adjusting the tipping situation via active automatic control loops permanently and regularly or on requirement. For such an arrangement it is preferential to plan an automatic control loop that uses the tipping situation of the plate as correcting variable, in order to balance the described effects on the imaging optical arrangement. So, a possibly existing temperature or long-term drift error can be balanced in a simple manner in the optical arrangement.

Since it is well known that the parallel shift by a plane parallel plate depends on the refractive index of the transparent disk material, color transverse errors can develop by a wavelength dependent parallel shift due to a dispersion of the disk material in polychromatic radiation in the light path of the optical arrangement. By structuring the plane parallel plate from one or several sub panels one can compensate such color transverse errors caused by the plane-parallel plate.

According to the invention the correction device can be also adjusted for the correction of varying color transverse errors of the optical image that are dependent on the operating conditions. For example, if an optical arrangement is able to work with different wavelengths then a wavelength-dependent and thus operating condition-dependent color transverse error can occur. According to invention the correction device can then adjust the plane parallel plate depending on the wavelength range used in the optical arrangement and the resulting color transverse errors, so that in the final result despite operation with different wavelength ranges an unchanged optical image is focused in the arrangement. Naturally for this correction again, as previously mentioned, a suitable servo mechanism can be used, which can also be an automatic control loop.

The requirements of the accuracy or sensitivity, with which the drive handles the mounting plate, can also be preset, like the acceptable parallel shift range via the thickness of the plane parallel plate.

The correction device according to the invention reduces, as previously mentioned, the requirements of adjustable optical elements in the focusing optical arrangement. This advantage is particularly important in the case of the already mentioned confocal microscope. In a confocal microscope a selected specimen area (Spot) is usually lit up and focused on a confocal slit in form of a so-called pinhole objective, followed by a detector. The radiation transmitted by this slit arrives with or without intermediate image on a detector; the detector can also serve as a confocal slit. The illumination can happen in a linear or punctiform pattern.

Care must be taken to focus the specimen area completely on the confocal slit plane in the pinhole objective. This is above all made more difficult by the fact that a confocal microscope exhibits regularly exchangeable beam splitters, with which an adjustment of the microscope for different applications takes place, i.e. a change of the irradiated or selected wavelengths. The optical elements capable of being activated individually are accompanied by tipping or wedge errors, which can be reduced only with large effort in such a way that they do not disturb the image in the microscope. The same applies to changes of temperature or of long-term drift. The correction device according to the invention permits the realization of a confocal microscope, with which errors caused by changing optical elements can be simply corrected without interfering with the optical image. Additionally, the correction device can also be adjusted between the confocal slit and detector and so the optical path between slit and detector can be corrected suitably.

Although in the case of confocal microscopes that use a pinhole objective before a spatially non-resolving detector for detection, the correction already facilitates the mechanical requirements regarding the optical elements capable of being activated, the saving of effort is particularly noticeable, if the confocal microscope covers a locally disintegrating detector. This is for example the case with line-scanning laser scanning microscope that uses a slit diaphragm as pinhole slit before a detector line. It is then possible, to balance via a corresponding adjustment of the tipping situation of the plane parallel transparent plate, both a compensation of deviations perpendicular to the slit diaphragm and also a compensation of deviations parallel to the slit diaphragm.

In the first case it is guaranteed that the light coming from the specimen meets the slit diaphragm accurately and is not off-center above or below the slit diaphragm. In the second case it is guaranteed that the light coming from the specimen meets the line detector correctly and there is no pixel shift between pictures of two detection channels in the system, each exhibiting its own line detector for example. Thus the confocal microscope according to the invention can reach a sub pixel accurate image registration during multi-channel training.

The problem with a slit diaphragm that deviates perpendicularly to the direction line is solved in the confocal microscope by the fact that now a narrow detector line can be used, without necessitating a movement of the slit diaphragm and detector. The unnecessary loss of light flux and the consequent reduction of the signal-to-noise ratio in case of a shift (caused by tipping and wedge errors of changeable elements) with a lowering following an increase in resolution of the slit diaphragm can be avoided.

Since the tipping or wedge errors of optical elements that can be activated individually are usually reproducible, the tipping situation of the transparent plane-parallel plate can be selected in a simple manner. With change of an optical element that can be activated, only a definite drive action of the plane parallel transparent plate is necessary in order to adjust the tipping situation newly required for the desired configuration of the microscope. Therefore a further training of the microscope according to the invention is preferential, in which the adjustable or adjustable elements in the light path are provided and which records the submission and a configuration of adjustable or adjustable elements as operating parameters and adjusts the tipping situation to be dependent on the value of the operating parameter.

An example of such a parameter, with which not only the shift of the optical image in relation to the pinhole slit but also a color transverse error is balanced, favorably provides for the usage of radiation of different wavelengths in the optical path of the microscope whereby the servo mechanism records the wavelength in the light path as the operating parameter and adjusts the tipping situation accordingly. Then for a confocal spectral multi-channel microscope one or more plane-parallel plates are first placed before the detector for each detection channel and the tipping situation of the plane-parallel plate is adjusted by the servo mechanism to be also dependent on the wavelength and/or the wavelength range of the plate directed toward the detector in the current channel.

One gets to use a confocal microscope comfortably, if an automatic control loop is provided that maximizes the radiation intensity at the detector unit, and/or minimizes the picture shift by adjusting the tipping situation of the plane-parallel plates as a correcting variable. Thus long-term effects or temperature changes involving shifts can be corrected at any time without a service technician.

Therefore an implementation is preferential, with which the aperture diaphragm and the detector unit are trained as a confocal slit diaphragm and as detector line respectively and whereby the tipping situation of the plane-parallel plate is adjusted about two axes such that the picture of the slit diaphragm is centered two-axis on the detector line.

BRIEF DESCRIPTION OF THE DRAWINGS

The invention is further described below with reference to the figure as an example. The figures illustrate.

DETAILED DESCRIPTION OF THE PREFERRED EMBODIMENTS

Figure 1:
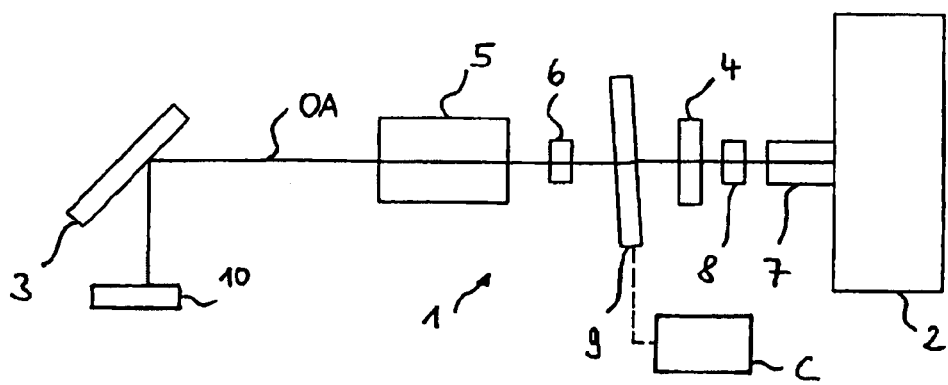
FIG. 1 a schematic representation of a detector arrangement of a laser scanning microscope, FIG. 2 a schematic representation clarifying the need for correction during the detector arrangement of FIG. 1, FIG. 3 a schematic representation of a plane parallel plate in the detector arrangement of FIG. 1, and FIG. 4 a perspective representation of the plane-parallel plate of FIG. 1 with motor drive.

FIG. 1 shows schematically a detector arrangement 1 for a Laser scanning microscope. The detector arrangement 1 exhibits a CCD line 2, which is coupled in via a color splitter 3 into the light path of the (not represented further) laser scanning microscope. The color splitter 3 is changeable, in order to be able to record radiation of different wavelength ranges with the detector arrangement 1. The adaptability by the changeable color splitter 3 can be given regarding the (excitation) radiation used in the laser scanning microscope and also regarding (fluorescence) radiation.

The CCD line 2 receives radiation via the color splitter 3, which falls on the CCD line 2 by a slit diaphragm 4 working as aperture diaphragm.

The slit diaphragm 4 forms a pinhole objective of the detector arrangement 1 together with an afore-arranged round optics 5 as well as a likewise afore-arranged first cylinder lens 6 as well as a subordinate second cylinder lens 7, whereby the pinhole is realized here by the slit diaphragm 4. Thus the laser scanning microscope is a line scanning microscope, in which a confocal or at least partly-confocal imaging of a rectangular or linear range (line) of a specimen takes places by means of the pinhole objective and/or the detector arrangement 1 on the CCD line 2.

The specimen is illuminated for fluorescence excitation, which is confocally imaged, is schematically represented as specimen field 10 in FIG. 1. In order to avoid an unwanted detection of excitation radiation reflected in the system at the CCD line 2, another barrier filter 8 having suitable spectral characteristics is connected before the second cylinder lens 7, in order to let only desired fluorescence radiation arrive at CCD line 2.

A change in the color splitter 3 or the block barrier filter 8 brings about inevitably a constant tipping or wedge error while turning. The color splitter can inject an error between specimen line 10 and slit diaphragm 4, barrier filter 8 can inject an error between slit diaphragm 4 and CCD line 2. In order to prevent the need for a readjustment of the situation of the slit diaphragm 4 and/or the CCD line 2, a plane-parallel plate 9 is arranged between the round optics 5 and the slit diaphragm 4, i.e. in the image beam path between the specimen field 10 and CCD line 2 which can be brought into different tipping positions under the control of the controller C. The plane-parallel plate 9 is attached in a suitable (not represented in FIG. 1) mounting plate, which will be described later in FIG. 4.

Figure 3:
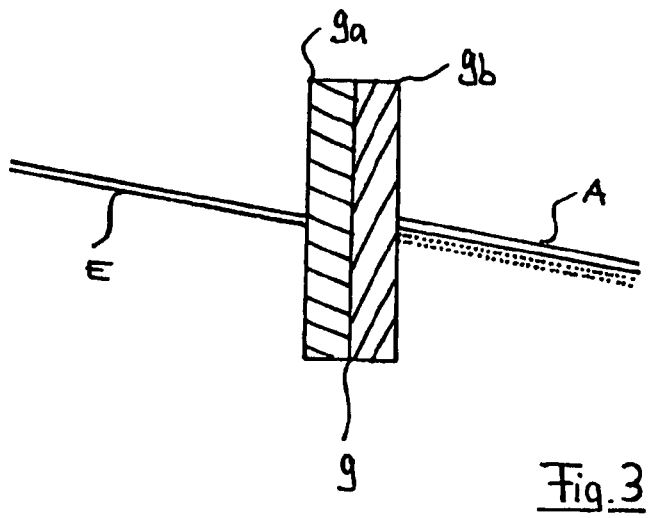

The plane parallel plate 9 causes a parallel shift of the Z-axis OA, which is shown in FIG. 1. This parallel shift can be seen schematically also in FIG. 3, which concerns (described later) an implementation form of a two-part plane-parallel plate 9. The radiation beams E diagonal to plate 9 breaking in to the disk surface withdraw as transferred radiation beams A. Without plane-parallel plate 9 there would be a dropping of the beam, drawn as a dashed line in FIG. 3.

Figure 2:
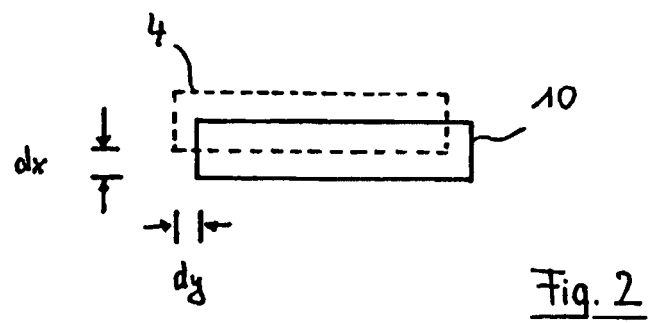

A change of the tipping position of the plane-parallel plate 9 makes it possible to adjust the situation of the specimen line opposite the slit diaphragm 4 (as well as with the usage of the plate 9 after the slit diaphragm alternatively also the situation of the slit diaphragm 9 to the CCD line 2 acting as slit) such that for given conditions in the light path, which may themselves change by changes of the color splitter 3, always an optimal, i.e. two axis centered situation is given. This is illustrated in FIG. 2, which shows the projection of the slit diaphragm 4 to the specimen line 10 in plan view. As illustrated, due to a tipping or a wedge error, which can be caused by for example by the color splitter 3 or the barrier filter 8, a shift dx adjusts itself in x-direction dx and a shift dy in the y-direction between slit diaphragm 4 and specimen line 10.

The consequence of shift dx is that the signal-to-noise ratio is unnecessarily worsened. If one would like to improve the dissolution of depth in the confocal microscope by lowering the slit diaphragm 4, i.e. by reducing its expansion in x-direction, it can happen that with a shift dx, which is larger than the half height of the specimen line 10 no more radiation arrives at the CCD line. The shift dx has then the consequence that the dissolution of depth attainable with the laser scanning microscope is actually smaller than is actually attainable with the equipment. The same applies to the alternative or cumulative variations in the adjustment of slit diaphragm 4 and CCD line 2.

The adjustment of the specimen field 10 in relation to the slit diaphragm is attained by adjusting the tipping situation of the plane parallel plate 9 such that no surface ranges of the CCD line 2 remain unnecessarily unirradiated when seen in x-direction.

On the other hand the shift dy causes the fact that the local information recorded in y by the CCD line 2 does not correspond to the actual emission or reflection conditions at the specimen field 10. Artifacts or a shift in the image can be the result. The adjustment of the tipping situation of plate 9 makes it possible to minimize the shift dy preferably even bringing it to zero so that the slit diaphragm 4 is centrically on the CCD line 2 and is pixels of the CCD line 2 are correctly illuminated. This is important in particular if the laser scanning microscope exhibits several detector arrangements 1, which select different color channels via different color splitters 3. Since due to the individual adjustments of the detector arrangements 1 with their color splitters 3 different shifts dy would be present, an error would be the result in such a multi-channel laser scanning microscope in the allocation of the individual color channels in a compound picture.

Depending upon wavelength or wavelength range evaluated in the detector arrangement 1, the pinhole objective of the detector arrangement 1 can exhibit a different color transverse error. Same applies to the elements arranged before detector arrangement 1, for example the color divisor 3 or other optics lying on the Z-axis OA. By the adjustment of the tipping situation of the plate 9 this color transverse error can be compensated purposefully. The controller C steers plate 9 in a tipping situation, whereby each one in the wavelength range and/or each wavelength, for which the detector arrangement 1 can be used, is assigned with its own tilting situation.

If in the detector arrangement 1 relatively wide-band radiation is guided, the plane parallel plate can cause a color transverse error, if the dispersion of the transparent material of the plane-parallel plate 9 is such that a wavelength-dependent shift of the dropping radiation beam A is opposite to the incident radiation beam E. For compensation the structure of the plane parallel plate 9 represented in FIG. 3 consists of two sub panels 9a, 9b. The materials of these sub panels 9a, 9b are different and selected in such a way that in the wavelength range, for which the detector arrangement 1 is appropriate, dispersion caused by color transverse errors if possible cancel themselves. For example the subpanel 9a causes for shorter wavelengths a stronger shift than the sub panel 9b; the reverse applies to longer wavelengths. Thus a compensation of the color transverse error of the plane-parallel plate 9 is attained. For the production of a color-independent or aimed color-dependent parallel shift also two separated tippable plates with diversion moving in opposite directions and from materials with different dispersion can be used.

The controller C adjusts the tipping situation of the plate 9 to the default of a user, after evaluation of the current configuration (in particular also environment or equipment temperature or other external measured variables) of the Laser scanning microscope or in continuous or intermittently running control procedures. In the case of a regulation the tilting situation of the plate 9 is used as correcting variable. As regulated size the radiation intensity or the picture shift on the CCD line 2 can be evaluated in a calibration step.

Figure 4:
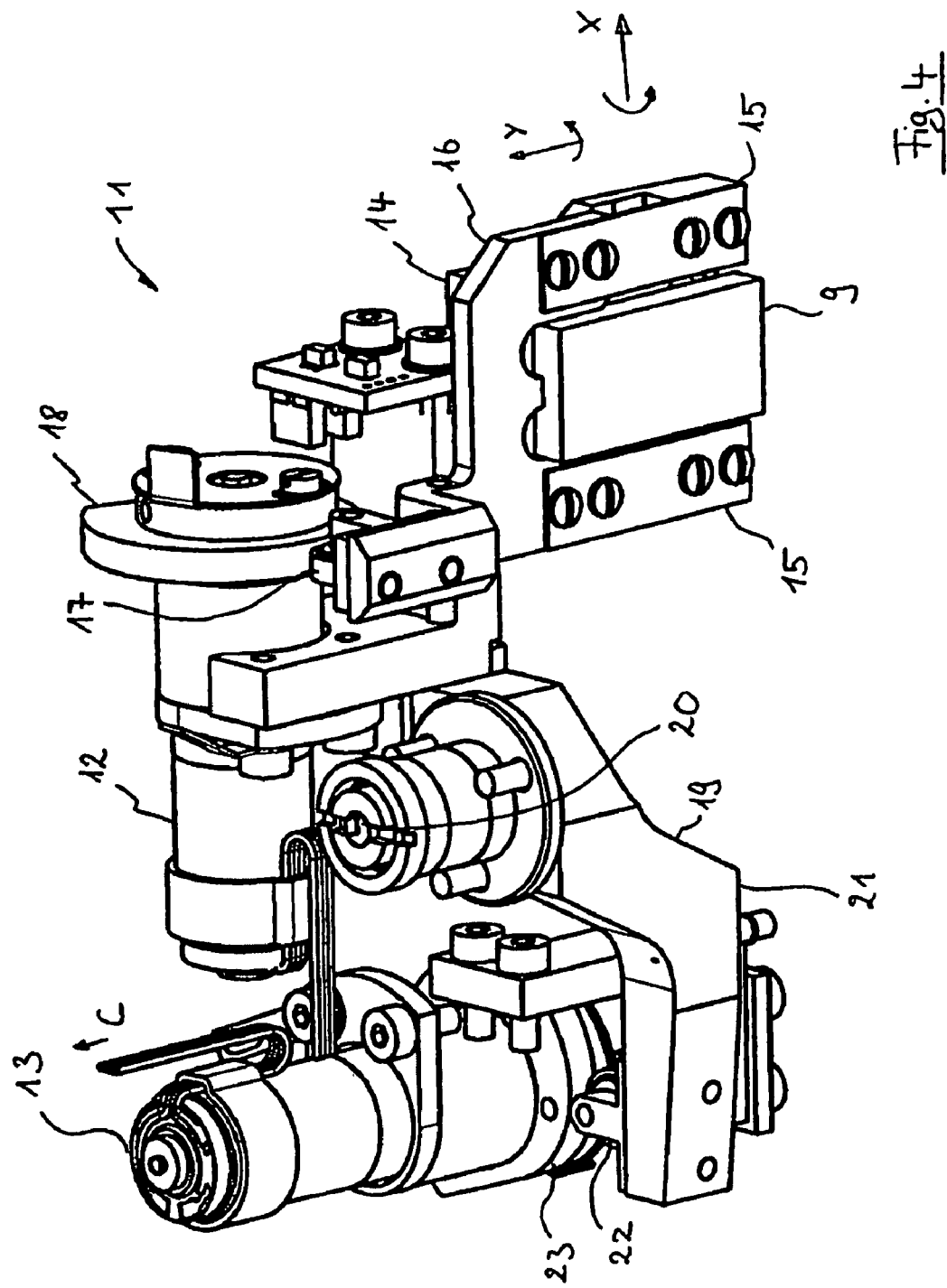

The drive 11 steered by the controller C is represented in FIG. 4. As illustrated, the plane-parallel plate 9 is adjusted by means of two stepping motors 12, 13 by the x and/or y axis. The adjustment of the x-axis is a tipping motion with an axis of rotation in the center of plate 9. The turn around the y-axis is a swiveling around an axis lying outside of the plate.

For tipping around the x-axis a retaining plate 14 is provided, onto which a pair of leaf springs 5 is screwed, which fasten a framework 16, in which the plane-parallel plate 9 is provided. The leaf springs 15 specify the tipping axis. They press one roll 17 fastened at the framework 16 on a cam disc 18, which is propelled by the stepping motor 12, which likewise sits on the retaining plate 14. Depending on position of the cam disc 18 the role 17 and the framework 16 are thus steered differently, by which the tipping of the plate 9 is attained around the x-axis.

The retaining plate 14 is for its part an arm of a lever 19, which is swiveling around a drag axis 20. The drag axis 20 represents the axis for the movement of the plate 9 around the y-level. The other arm 21 of the lever 19 carries a role of 22 at its end, which rests against a cam disc 23, which is propelled by the stepping motor 13. Just as the leaf springs 15 press the role 17 on the cam disc 18, a spring element is intended at the drag axis 20, which presses the role 22 on the cam disc 23.

By control of the stepping motors, 12, 13 the controller C, which is connected via not any further illustrated lines with the stepping motors, can adjust the tipping and/or swiveling situation of the plane parallel plate 9 in the light path of the detector arrangement 1 using the motor. By the incremental control of the stepping motors 12, 13 the current position of the plate 9 at each point of period of operation is well-known to the controller C in combination with a reference position started at the operating beginning, so that the position of the plate 9 can be used in an automatic control circuit can be used as correcting variable and/or can be adjusted in accordance with stored defaults.

The invention claimed is:

1. Confocal microscope having an illumination beam path and an image beam path, the microscope comprising:
    coupling means for coupling the illumination beam path and the image beam path,
    adjusting means for adjusting operating conditions of the microscope,
    a confocal aperture placed in the image beam path,
    focusing optics placed in the image beam path for focusing a selected specimen field on the confocal aperture and for defining a converging beam area in the image beam path,
    a detector unit following the confocal aperture,
    a correction device for centering the focused specimen field on the confocal aperture, the correction device including at least one plane-parallel transparent plate, wherein the at least one plane-parallel transparent plate has at least one of a tilting and a swiveling movement around at least one axis, wherein the at least one plane-parallel transparent plate is placed in the focusing image beam path between the focusing optics and the confocal aperture, and
    control means for recording at least one operating parameter of the confocal microscope and adjusting the tilting situation of the at least one plane-parallel transparent plate to be dependent on the setting of the operating parameter, wherein the at least one operating parameter includes a setting of the adjusting means.

2. Microscope according to claim 1, wherein the detector unit comprises a spatially resolving detector.

3. Microscope according to claim 1, wherein:
    the control means comprises a servo mechanism.

4. Microscope according to claim 3, wherein the image beam path guides radiation of different wavelengths and the servo mechanism records the wavelength in the image beam path as an operating parameter.

5. Microscope according to claim 1,
    wherein the confocal aperture is designed as a slit diaphragm and the detector unit is designed as a line detector and wherein the tilting situation is adjustable about two axes such that the image of a specimen line is centered on the slit diaphragm.

6. Microscope according to claim 1,
    wherein the confocal aperture is designed as a slit diaphragm and the detector unit is designed as a line detector and wherein the tilting situation is adjustable about two axes such that the image of the slit diaphragm is centered about two axes on the detector line.

7. Microscope according to claim 1 wherein the microscope has an excitation beam path for the illumination of the selected specimen field, and wherein the at least one plane-parallel plate is included in the excitation beam path.

8. Microscope according to claim 1, wherein the control means comprises an automatic control loop.

9. Microscope according to claim 1, wherein the coupling means is the adjusting means.

10. Confocal microscope having an illumination beam path and an image beam path, and the microscope comprising:
    coupling means for coupling the illumination beam path and the image beam path,
    a confocal aperture placed in the image beam path,
    focusing optics placed in the image beam path for focusing a selected specimen field on the confocal aperture and for defining a converging beam area in the image beam path,
    a detector unit following the confocal aperture,
    a correction device for centering the focused specimen field on the confocal aperture, the correction device including at least one plane-parallel transparent plate placed in the converging beam area between the focusing optics and the confocal aperture, wherein the at least one plane-parallel transparent plate has at least one of a tilting and a swiveling movement around at least one axis, and
    an automatic control loop (C) that uses the tilting situation of the at least one plane-parallel transparent plate as a correcting variable, wherein the automatic control loop (C) maximizes the radiation intensity at the detector unit or minimizes an image misalignment, or both.

11. Microscope according to claim 10, wherein the detector unit comprises a spatially resolving detector.

12. Microscope according to claim 10,
    wherein the control means comprises a servo mechanism.

13. Microscope according to claim 12, wherein the image beam path guides radiation of different wavelengths and the servo mechanism records the wavelength in the image beam path as an operating parameter.

14. Microscope according to claim 10, wherein the automatic control loop includes a servo mechanism, which records at least one operating parameter of the optical arrangement and which adjusts the tilting situation to be dependent on the value of the operating parameter, and
    wherein the confocal aperture is designed as a slit diaphragm and the detector unit is designed as a line detector and wherein the tilting situation adjustable about two axes such that the image of a specimen line is centered on the slit diaphragm.

15. Microscope according to claim 10, wherein the automatic control loop includes a servo mechanism, which records at least one operating parameter of the optical arrangement and which adjusts the tilting situation to be dependent on the value of the operating parameter, and
wherein the confocal aperture is designed as a slit diaphragm and the detector unit is designed as a line detector and wherein the tilting situation is adjustable about two axes such that the image of the slit diaphragm is centered about two axes on the detector line.

16. Microscope according to claim 10, wherein the microscope has an excitation beam path for the illumination of the selected specimen field, and wherein the at least one plane-parallel plate is included in the excitation beam path.

17. Microscope according to claim 10, wherein one of the adjusting means is a main beam splitter for coupling the illumination beam path and the image beam path.

18. Confocal microscope having an illumination beam path and an image beam path, and the microscope comprising:
coupling means for coupling the illumination beam path and the image beam path,
adjusting means for adjusting operating conditions of the microscope, and
a confocal aperture placed in the image beam path,
focusing optics placed in the image beam path for focusing a selected specimen field on the confocal aperture and for defining a converging beam area in the image beam path,
a detector unit following the confocal aperture,
a correction device for centering the focused specimen field on the confocal aperture, the correction device including at least two plane-parallel transparent plates, each of the plane parallel-plates being tiltable around at least one axis,
wherein the plane-parallel transparent plates are placed upstream in the image beam path of the detector unit in the converging beam area, between the focusing optics and the confocal aperture, in order to center the image of the selected specimen field on one of the detector unit and an image of the confocal aperture on the detector unit,
control means for recording at least one operating parameter of the confocal microscope and adjusting the tilting situation of the at least two plane-parallel transparent plates to be dependent on the setting of the operating parameter, wherein the at least one operating parameter includes a setting of the adjusting means.

19. Microscope according to claim 18, wherein the detector unit comprises a spatially resolving detector.

20. Microscope according to claim 18, wherein
the control means comprises a servo mechanism.

21. Microscope according to claim 20, wherein radiation of different wavelengths can be used in the image beam path and the servo mechanism records the wavelength in the image beam path as an operating parameter.

22. Microscope according to claim 18, wherein the control means includes an automatic control loop, and wherein the automatic control loop maximizes the radiation intensity at the detector unit or minimizes an image misalignment, or both.

23. Microscope according to claim 18, wherein two plane-parallel plates are provided between the specimen field and the confocal aperture and two plane-parallel plates are provided between the confocal aperture and the detector unit.

24. Microscope according to claim 18, wherein the microscope has an excitation beam path for the illumination of the selected specimen field, and wherein the at least two plane-parallel plates are included in the excitation beam path.

25. Microscope according to claim 18, wherein the coupling means is the adjusting means.

* * * * *